Patented June 24, 1924.

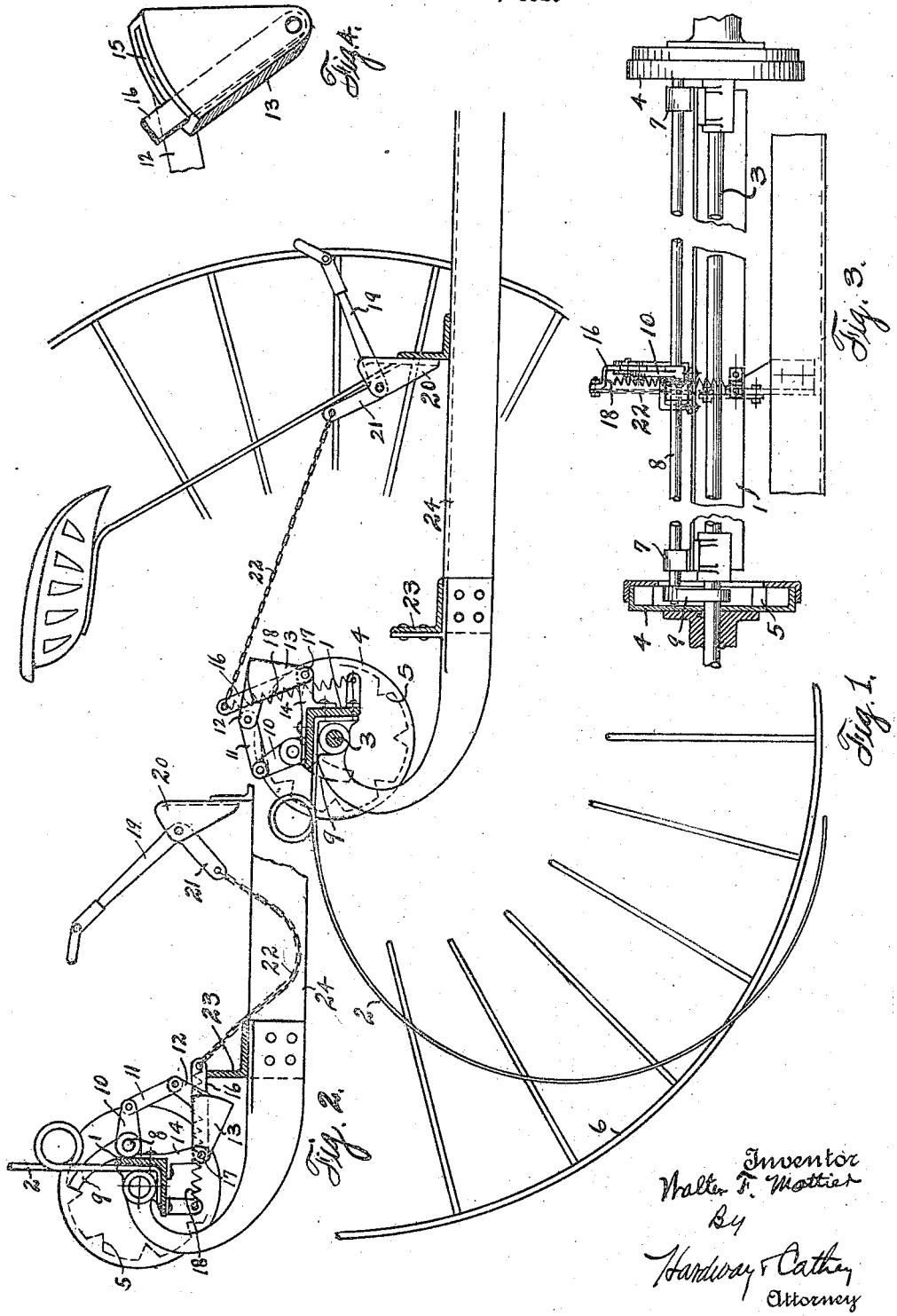

1,498,694

UNITED STATES PATENT OFFICE.

WALTER F. MOTTIER, OF EL CAMPO, TEXAS.

HAYRAKE.

Application filed December 3, 1920. Serial No. 428,104.

*To all whom it may concern:*

Be it known that I, WALTER F. MOTTIER, a citizen of the United States, residing at El Campo, in the county of Wharton and State of Texas, have invented certain new and useful Improvements in a Hayrake, of which the following is a specification.

This invention relates to new and useful improvements in a hay rake.

One object of the invention is to provide in a hay rake a device whereby the dogs, which lock the rake head in engagement with the ground wheels for rotation, will be securely held in engagement, until released and which will hold said dogs in released position, after they are released, to permit the rake teeth to fall into raking position. In rakes now in common use the devices employed for this purpose are uncertain in action and for that reason the rake head, after being released, is prematurely reconnected to the wheels, thus causing a second dumping action of the teeth.

Another object of the invention is to provide in a rake, a device whereby the dogs will be positively disengaged after the load has been dumped and thereafter securely held in disengaged position to permit the rake teeth and head to fall into active or raking position.

With the above and other objects in view the invention has particular relation to certain novel features of construction and operation, an example of which is given in this specification and illustrated in the accompanying drawings, wherein:—

Figure 1 is a fragmentary vertical sectional view, showing the parts in raking position.

Figure 2 is a fragmentary vertical sectional view, showing the parts in dumping position.

Figure 3 is a fragmentary vertical sectional view as seen from the rear, and

Figure 4 is a fragmentary perspective view of the actuating lever and segment which co-acts therewith.

Referring now more particularly to the drawings, the numeral 1 refers to the rake head which is preferably formed of angle iron and which carries the rake teeth 2. The rake head is rotatably mounted relative to the axle 3. The respective ends of this axle have the discs 4, 4 fixed thereon and provided with the internal gear teeth 5. These discs 4 rotate with the axle and with the ground wheels 6 which support said axle. The rake head has the bearings 7, 7 fixed thereto in which the shaft 8 is rotatably mounted and fixed to the respective ends of this shaft there are the dogs 9, 9. The shaft 8 has a central arm 10 fixed thereto, to the free end of which the link 11 is pivoted at one end and the other end of this link is pivoted to the lug 12 which is secured to the segment 13. The lower end of this segment is pivoted between the fingers of a bifurcated lug 14 which is fastened to the rake head and said segment has a deep slot 15 formed therein in which the lever 16 works and a bearing pin 17 passes through the fingers of the lug 14 and through the lower ends of said segment and lever 16 and forms a common bearing for said lever and segment. A tension spring 18 is attached at its upper end to the upper end of the lever 16 and at its lower end it is secured to the rake head. A foot pedal 19 is pivoted to the bearing plate 20 and has a rearwardly extending arm 21 which is connected to the lever 16 through a flexible connection such as a chain 22.

When it is desired to dump the load the driver pushes the pedal 19 forwardly and this will operate through the chain 22 to pull the lever 16 forwardly and this lever will travel in the slot 15, the spring 18 yielding to permit this, until the lever reaches the forward end of the slot 15. At this point the spring 18 will have passed center, or in other words, will have passed the pivotal point on which said segment operates, and will thereafter operate to hold said lever at the forward end of the slot 15 and a continued forward pressure on said pedal 19 will then operate to carry the segment forwardly and this will operate through the link 11 and the arm 10 to rotate the shaft 8 and throw the dogs into engagement with the teeth 5 which will lock the rake head with the ground wheels and the rotation of the latter will cause the entire rake head to rotate and lift the teeth 2 into dumping position. During this movement of the rake head the dogs 9 will be held in engagement with the teeth 5 through the pull of the tension spring 18 and thereby prevented from accidental disengagement. When the rake head is turned into dumping position the outer end of the lever 16 will strike against the stop 23, which is arranged in front of the rake head and secured to the frame 24.

The movement of the lever will then be thereby stopped but the rake head and the segment 13 will continue to rotate forwardly until said segment is stopped by the lever 16, coming in contact with the other end of the slot 15 and the further movement of the rake head relative to said segment will operate through the link 11 and the arm 10 to disengage said dogs from the teeth 5 and this will release the rake head from the wheels and it, together with the teeth 2, will fall by gravity into raking position shown in Figure 1. Meanwhile the tension spring 18 will have again passed center to the other side of the pivotal point of the segment and the pull of said spring will operate to hold said dogs disengaged, thus preventing a premature dumping action of the rake head.

From the foregoing it is obvious that the pull of the spring in one position operates to hold the dogs in engagement with the teeth 5 and when in its other position it operates to hold them disengaged, thus insuring the accurate position of the rake head.

What I claim is:—

1. In a hay rake, the combination with a framework, ground wheels, a rake head, rake teeth carried by the rake head, of dogs pivotally mounted on the head, means for actuating said dogs into and out of locking engagement with the ground wheels whereby the head is forced to rotate with said wheels, a predetermined distance and is then released therefrom, said means including two pivotally mounted levers, one of which is connected to and actuates said dogs and a yieldable member connected to the other lever and acting by tension through the first mentioned lever to hold said dogs in either position.

2. In a hay rake, the combination with a framework, ground wheels, a rake head, of means for locking said head to rotate with the wheels, an actuating mechanism for actuating said means to lock said head with and release it from said wheels, said mechanism including a member connected to said locking means, a lever, provided to actuate said member but having a movement independent thereof, and a yieldable member connected with said lever and operating through it to hold said means in either locked position or in released position.

3. In a hay rake, the combination with a framework, ground wheels, a rake head, of means for locking said head to rotate with the wheels, an actuating mechanism for actuating said means to lock said head with and release it from said wheels, said mechanism including a shiftable member connected to said locking means, and adapted to actuate the same a lever having an independent movement relative to said member and which when moved in one direction will operate, through said member to actuate said means into locking position, a yieldable member connected with said lever and, operating through it and through said member, to hold said means in locking position, said lever when moved into the other position, operating through said member, to actuate said means into released position, the independent movement of said lever operating to shift the yieldable member into position to thereafter operate through the lever and member to hold said means in released position.

In testimony whereof I have signed my name to this specification in the presence of two subscribing witnesses.

WALTER F. MOTTIER.

Witnesses:
 JAS. W. OLIVER,
 E. V. HARDWAY.